E. M. NIEBLING.
VALVE SET.
APPLICATION FILED AUG. 10, 1915.
1,234,930.
Patented July 31, 1917.
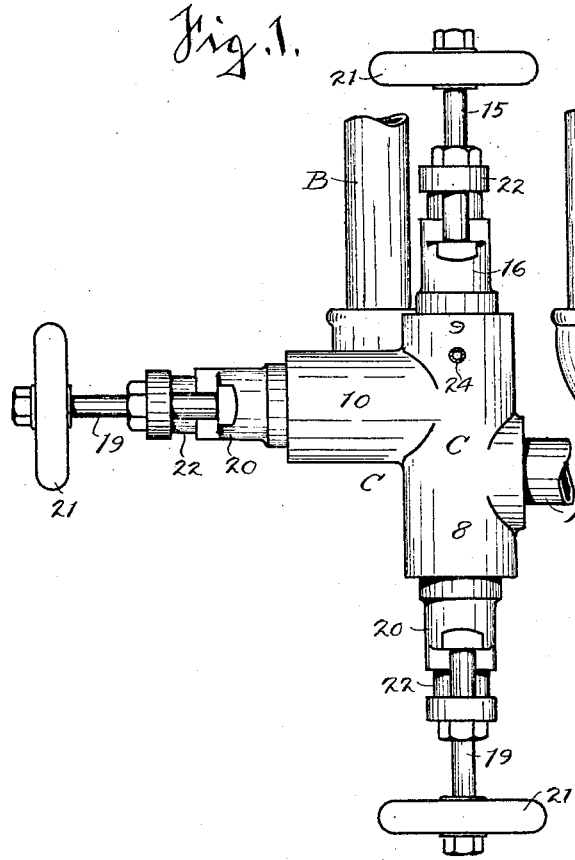
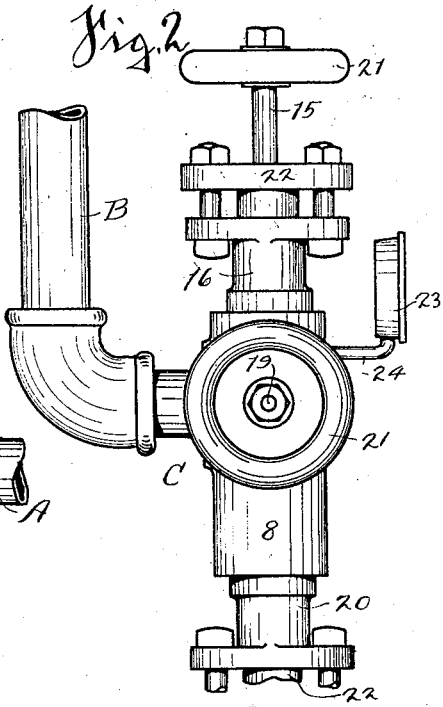
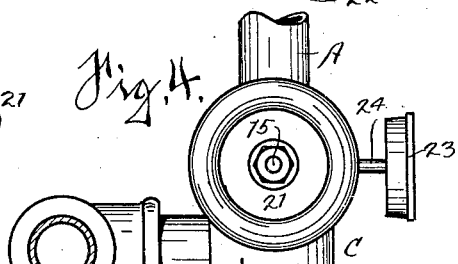
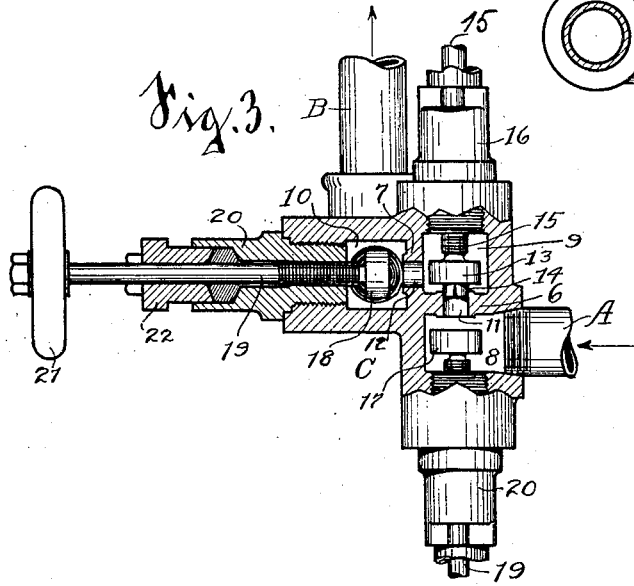
Inventor,
Edwin M. Niebling
by C. Spengel Atty

UNITED STATES PATENT OFFICE.

EDWIN M. NIEBLING, OF CINCINNATI, OHIO.

VALVE SET.

1,234,930.  Specification of Letters Patent.  Patented July 31, 1917.

Application filed August 10, 1915. Serial No. 44,794.

*To all whom it may concern:*

Be it known that I, EDWIN M. NIEBLING, a citizen of the United States, and a resident of Cincinnati, Hamilton county, State of Ohio, have invented a certain new and useful Valve Set, of which the following is a clear, full, and exact description, attention being called to the drawing which accompanies this application and forms a part thereof.

In pipe and conduit-systems occurring in manufacturing establishments there are valves which are used to control and regulate passage from one part of a system to another part. If such a valve becomes disabled and requires removal for repair or renewal, such removal cannot be effected unless the entire pipe-system on both sides of the valve is emptied. For obvious reasons this is very objectionable since it entails an interruption in operations and also causes loss of the matter handled. As an apt illustration of these conditions, a refrigerating plant is mentioned, where ammonia gas is used and moved through pipes to cool brine, or air in cooling rooms.

The pipe-system of such a plant consists, broadly considered, of two parts. In one part the ammonia is compressed and moved under high pressure. In the other part, which contains substantially the cooling pipes, the ammonia, in gaseous form, is under low pressure. The transit of the ammonia from one part to the other, that is, from the high-pressure part to the low-pressure part, is controlled by a valve whereby this transit is regulated to lower the pressure of the gas to effect its expansion.

Obviously a defect in such a valve affects the operativeness of the plant and if removal of the valve becomes necessary, such cannot be effected unless the entire pipe-system is first emptied to prevent escape of gas which, especially in cold storage establishments, is highly objectionable.

To obviate these difficulties and to prevent interruption in the operation of a plant, I have devised a set of valves combined in a certain manner and which set of valves by its use permits access and removal of such a controlling valve, without necessitating a shut-down of the establishment and an interruption of operation.

In the following specification and particularly pointed out in the claim at the end thereof, is found a full description of my invention, also of its operation, parts and their construction which latter is illustrated in the accompanying drawing, in which:

Figure 1, is an elevation of my valve-set.

Fig. 2, is another elevation thereof, showing the valve-set as it appears when view from the left side of Fig. 1.

Fig. 3, is part of a view similar to Fig. 1, and shows it with portions broken away and shown in section.

Fig. 4, is a top-view of the valve-set as it appears in Fig. 2.

The invention is described as used in connection with the pipe-system of a refrigerating plant and where ammonia forms the refrigerating agent.

As before mentioned, the pipe-system of such a plant consists broadly considered of two parts. In one part the ammonia is compressed and moved under high pressure. In the other part it moves under low pressure. The change of pressure is obtained by means of a valve which controls the passage of the ammonia from one part of the pipe-system to the other.

In the drawing letter A indicates the end-portion of a pipe where the high-pressure part of the pipe-system of the plant terminates. Letter B indicates the end portion of a pipe where the low-pressure part of the pipe-system begins. C is a valve-housing which is subdivided by partitions 6 and 7 to form valve-chambers 8, 9 and 10 respectively. This housing is interposed between the two pipe-ends and the parts are so positioned that pipe A leads into chamber 8 and pipe B leads from chamber 10, both chambers being open outwardly to permit connection of these pipes. The valve chambers also communicate, chamber 8 with chamber 9 by means of a port 11 in partition 6, and chambers 9 and 10 by means of a port 12 in partition 7. The ammonia passes from pipe A into chamber 8, through port 11 into chamber 9, through port 12 into chamber 10 and from chamber 10 out through pipe B. Its passage is controlled by means of a valve 13, contained in valve-chamber 9 and positioned to coöperate with port 11 by seating against partition 6. In the case of ammonia, this valve is preferably of the expansion-valve type to permit close adjustment. For such purpose it is provided with a plug-shaped extension 14 which is fitted into port 11 and provided in its side with a triangular V-shaped notch, the rate of flow of ammonia being dependent on the size of that part of the notch which is even with the valve-seat. The drawing shows the valve partly open and when it is seated against partition 6 no ammonia passes.

This valve is carried at the end of a stem 15 whereby it is manipulated and which is seated in a cap 16 whereby the valve-chamber is closed. This valve is frequently used and the condition of the gas in the low-pressure part of the system (pipe B) depends on its position and its regulating capacity. Therefore, if defective, correction is needed at once. This cannot be done without access to the valve which requires removal of cap 16. To permit this it is necessary that the ammonia be first removed from both parts A and B, of the pipe-system which is usually done by means of pumps. This means interruption in the operation of the plant, loss of time and loss of ammonia.

To overcome these difficulties, I provide additional valves in valve-housing C, one indicated at 17 in chamber 8 and the other shown at 18 in chamber 10. Valve 17 is positioned to seat against the underside of partition 6 so as to control passage through port 11 independent of valve 13. Valve 18 is positioned to seat against partition 7 to control passage through port 12 therein. It will now be seen that by closing port 11 by means of valve 17, the high-pressure part of the system is closed and by closing port 12 by means of valve 18, the low-pressure part of the system is closed. Valve-chamber 9 is cut out of the circuit and isolated therefrom. It may readily be opened by removal of cap 16 after which valve 13 may be taken out, repaired and replaced, or substituted by a new one. No loss of time or interruption worth consideration takes place. Under normal conditions these additional valves are never touched and remain constantly open as shown. Both have stems 19 for their operation and are seated in caps 20 similar to cap 16. Each of the three valve-stems is provided with a hand-wheel 21 for manipulation.

The outer end of each of the caps 16, 20 and 20, is provided with a stuffing-box of which 22 is the gland. 23 is a pressure-gage mounted on a pipe 24.

My device is also applicable in connection with systems where other gases, liquids, air or steam is handled. The valve-housing in each case is modified to meet special conditions as to the position of the pipe-connections.

Having described my invention I claim as new:

In a valve-set, the combination of a valve housing containing three, substantially cylindrical, valve-chambers two of which are in axially alined relation while the third chamber is arranged at right angles to the alined chambers, a partition between the two alined valve-chambers, a partition between one of the said alined valve-chambers and the said third chamber, a port in each one of these partitions whereby adjoining chambers may communicate with each other and a valve to control communication between each of the chambers and the one adjoining it.

In testimony whereof, I hereunto affix my signature this 7th day of August, 1915, in the presence of two witnesses.

EDWIN M. NIEBLING.

Witnesses:
C. SPENGEL,
A. JOHNSON.

Copies of this patent may be obtained for five cents each, by addressing the "Commissioner of Patents, Washington, D. C."